United States Patent
Lelescu

(10) Patent No.: US 8,135,233 B2
(45) Date of Patent: Mar. 13, 2012

(54) METHOD AND APPARATUS FOR THE RESTORATION OF DEGRADED MULTI-CHANNEL IMAGES

(75) Inventor: Dan Lelescu, Morgan Hill, CA (US)

(73) Assignee: Aptina Imaging Corporation, George Town (KY)

( * ) Notice: Subject to any disclaimer, the term of this patent is extended or adjusted under 35 U.S.C. 154(b) by 925 days.

(21) Appl. No.: 12/153,684

(22) Filed: May 22, 2008

(65) Prior Publication Data
US 2009/0290806 A1 Nov. 26, 2009

(51) Int. Cl.
*G06K 9/40* (2006.01)
(52) U.S. Cl. ...................................... 382/275
(58) Field of Classification Search ........... 382/254–275
See application file for complete search history.

(56) References Cited

U.S. PATENT DOCUMENTS

| | | | |
|---|---|---|---|
| 5,761,346 A * | 6/1998 | Moody | 382/254 |
| 6,967,748 B1 | 11/2005 | Takarada | |
| 7,054,502 B2 * | 5/2006 | Nakano et al. | 382/275 |
| 7,190,395 B2 * | 3/2007 | Nakano et al. | 348/241 |
| 7,224,371 B2 | 5/2007 | Serizawa | |
| 7,616,841 B2 * | 11/2009 | Robinson et al. | 382/312 |
| 2001/0008418 A1 * | 7/2001 | Yamanaka et al. | 348/222 |
| 2003/0169944 A1 | 9/2003 | Dowski, Jr. et al. | |
| 2005/0089239 A1 | 4/2005 | Brajovic | |
| 2006/0013479 A1 * | 1/2006 | Trimeche et al. | 382/167 |
| 2006/0093234 A1 | 5/2006 | Silverstein | |
| 2006/0209292 A1 | 9/2006 | Dowski, Jr. et al. | |
| 2006/0239549 A1 | 10/2006 | Kelly et al. | |
| 2007/0098292 A1 | 5/2007 | Batur | |
| 2007/0165961 A1 * | 7/2007 | Lu | 382/254 |
| 2007/0188619 A1 | 8/2007 | Kurata | |
| 2007/0239417 A1 | 10/2007 | Alon et al. | |
| 2007/0258707 A1 | 11/2007 | Raskar | |
| 2008/0013850 A1 * | 1/2008 | Sakurai et al. | 382/255 |
| 2009/0141140 A1 * | 6/2009 | Robinson | 348/222.1 |
| 2009/0190851 A1 * | 7/2009 | Chien et al. | 382/255 |
| 2010/0246952 A1 * | 9/2010 | Banner et al. | 382/167 |

FOREIGN PATENT DOCUMENTS

| | | |
|---|---|---|
| EP | 1507233 A2 | 2/2005 |
| WO | WO 2004/102474 A2 | 11/2004 |
| WO | WO 2006/104710 A1 | 10/2006 |
| WO | WO 2007/089668 A2 | 8/2007 |
| WO | WO 2008/007717 A1 | 1/2008 |

OTHER PUBLICATIONS

Lei Zhang, et al., "Color Reproduction From Noisy CFA Data of Single Sensor Digital Camera," IEEE Transactions on Image Processing, vol. 16, No. 9, Sep. 2007, pp. 2184-2197.

Mejdi Trimeche, et al., "Multichannel Image Deblurring of Raw Color Components," http://www.cs.tut.fi/~foi/papers/MultichannelImageDeblurringofRawColorComponents.pdf.

(Continued)

*Primary Examiner* — Jingge Wu

(57) ABSTRACT

An imager and method for operating the imager. The imager comprises a pixel array for producing an image signal and an image processor configured to restore images degraded by inter-channel degradations and intra-channel degradations in all channels of the image simultaneously by diagonalizing an image degradation matrix and componentizing the diagonalized image degradation matrix and multi-channel image.

7 Claims, 15 Drawing Sheets

OTHER PUBLICATIONS

Brent McCleary, "Cross-talk Correction Methodology for Color CMOS Imagers," Proceedings of SPIE, vol. 5678, Digital Photography, Feb. 2005, pp. 117-128.

Tsuban Chen, "The Past, Present and Future of Image and Multidimensional Signal Processing," IEEE Signal Processing Magazine, Mar. 1998, vol. 15, Issue 2, pp. 21-58.

Jonghwa Lee, et al, "Edge-adaptive Demosaicking for Artifact Suppression Along Line Edges," IEEE Transactions on Consumer Electronics, vol. 53, No. 3, Aug. 2007, pp. 1076-1083.

Nai-Xiang Lian, et al., "Adaptive Filtering for Color Filter Array Demosaicking," IEEE Transactions on Image Processing, vol. 16, No. 10, Oct. 2007, pp. 2515-2525.

* cited by examiner

FIG. 2C

METHOD AND APPARATUS FOR THE RESTORATION OF DEGRADED MULTI-CHANNEL IMAGES

FIELD OF THE INVENTION

Embodiments disclosed herein are directed to the processing of digital color images.

BACKGROUND OF THE INVENTION

Solid state imagers, including charge coupled devices (CCD), complementary metal oxide semiconductor (CMOS) imagers, and others, have been used in photo-imaging applications. A solid state imager includes a focal plane array of pixel cells, or pixels, as an image sensor, each pixel includes a photosensor, which may be a photogate, photoconductor, photodiode, or other photosensitive element for accumulating photo-generated charge.

Most imagers today produce multi-spectral images having different color channels, e.g., red, blue and green. A common example is the downsampled raw Bayer image resulting from an image sensor. Whether the color images being produced by an image sensor are downsampled from one sensor having multiple color channels or have a full color-plane sensor for each of a plurality of color channels, they are referred to herein as "multi-channel images" to reflect the fact that they contain multiple color planes acquired using spectral filtering.

In the most general case, multi-channel images produced by one or more image sensors are subject to various intra-channel and inter-channel degradations such as out-of-focus blur, channel crosstalk, and noise. In addition, color channels are spatially-correlated due to the structure of the scene being imaged (e.g., a flat area, or an edge, appearing in all channels). The object of image restoration is to eliminate or reduce the various undesirable degradations that affect an image, by determining optimal estimators of the "original", non-degraded image.

Restoration often begins by expressing the degradation in terms of the following equation:

$$g = Hf + n,$$

where g is the multi-channel acquired image as received by an image processor, e.g., a Bayer image, f is the original, undegraded image, H is a representation of the multi-channel degradation and n is a noise component. This equation is illustrated in FIG. 1, which shows the original, undegraded image f being transformed by the image degradation H and then added to the noise component n to produce the multi-channel image g received in the image processor. Accordingly, the object of the image restoration is to obtain an accurate estimate of the original, undegraded image f by estimating and using an operator that inverts the image degradation H.

The most widespread restoration approaches were developed based on the need to process monochrome images, and are thus single-channel methods. The predominant method for the reduction of degradations of multi-channel images is also done as a single-channel restoration in the sense that each of the color channels are processed independently. It is well-known that approaches that process the channels of a multi-channel image independently are generally inferior to methods that jointly process the channels of the multi-channel image, since the former methods ignore inter-channel degradations and correlations.

While multi-channel image restoration techniques exist that do not process the channels independently, these techniques have many drawbacks, including: restoring only intra- or inner-channel degradations, but not both; containing iterative or recursive processing that is time and resource intensive; and containing the inversion of large, non-diagonal matrices, which is also time and resource intensive.

What is needed is an improved method and apparatus for multi-channel image restoration.

BRIEF DESCRIPTION OF THE DRAWINGS

FIG. 2C is an illustration of a method of operating an imager according to an embodiment described herein.

DETAILED DESCRIPTION OF THE INVENTION

Embodiments described herein restore degraded multi-channel images by processing all channels simultaneously, processing both intra-channel and inter-channel degradations and by avoiding large matrix inversions by transforming the restoration into smaller frequency domain operations that are feasible and efficient. In addition, embodiments described herein can be made spatially-adaptive to restore spatially-varying degradation in an image (with a pre-determined window of adaptation), and have provisions for processing window-boundary data.

Figure 1:
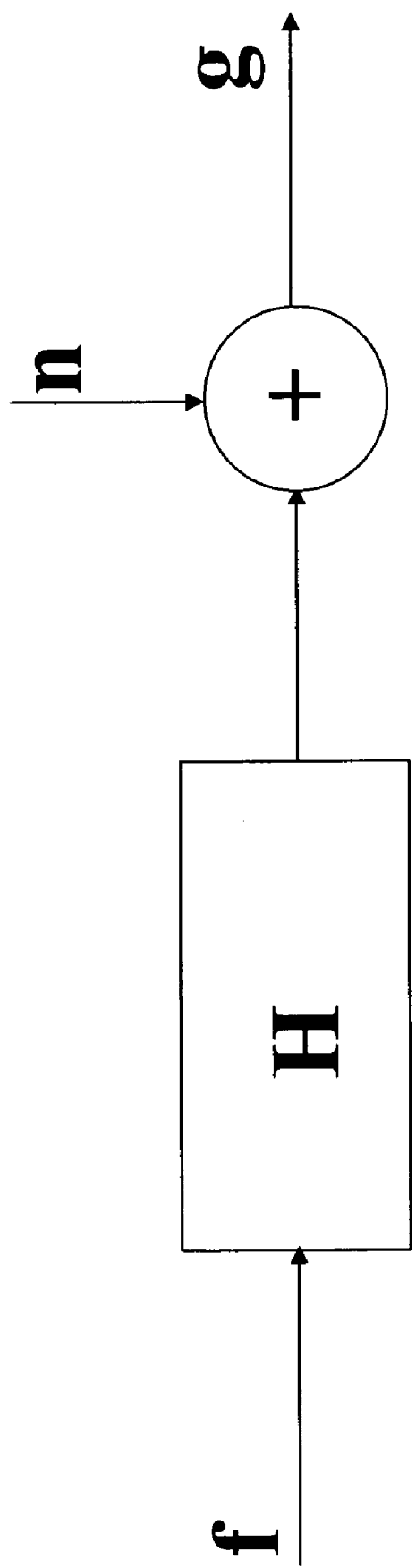
FIG. 1 is an illustration of an image degradation function commonly known in the art.
Figure 2:
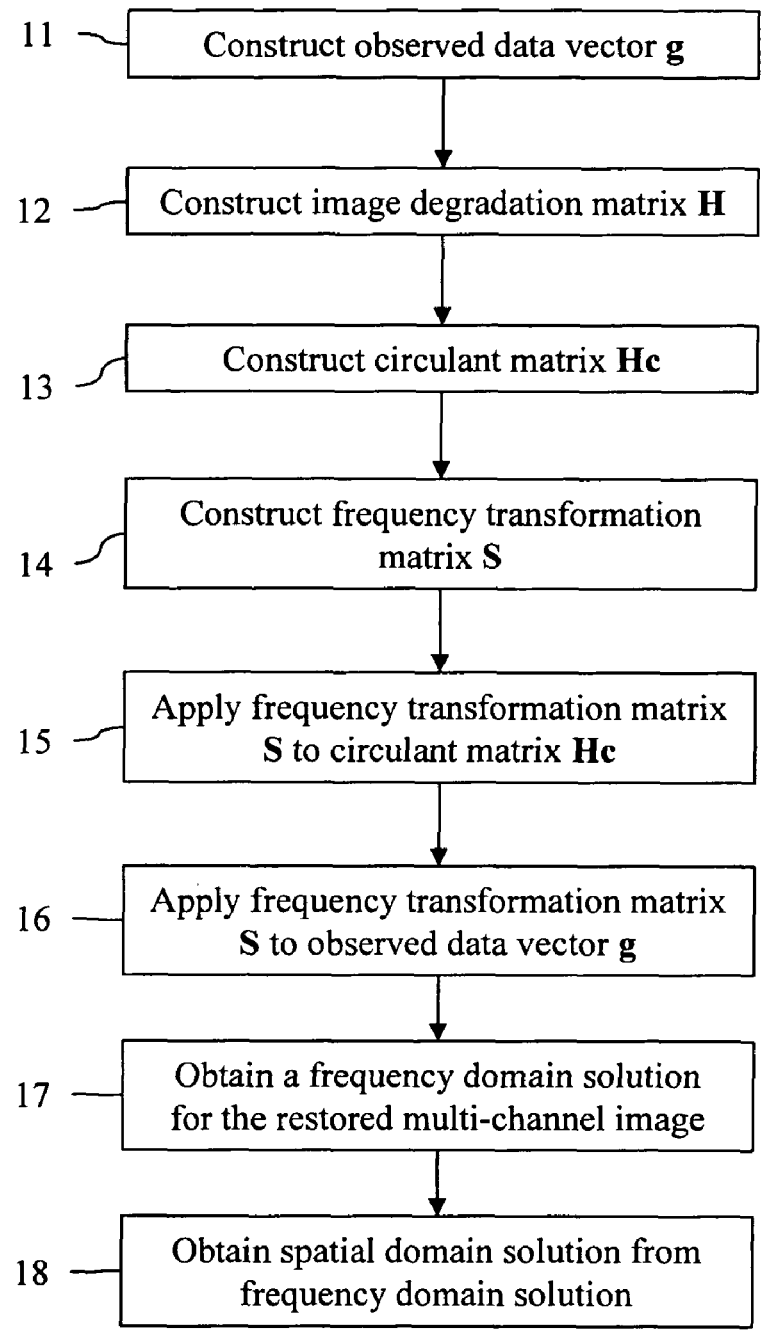
FIG. 2 is a flowchart illustrating a method of operating an imager according to an embodiment described herein.

Now referring to the figures, where like reference numbers designate like elements, FIG. 2 shows a first method embodiment for restoring a degraded multi-channel image, e.g. a degraded Bayer image or full channel image, where a noise component n is not considered in the restoration. The method illustrated in FIG. 2 obtains an optimal estimate of the original multi-channel image $\hat{f}$, e.g., a restored Bayer image, based on the following equation:

$$\hat{f} = H^{-1}g$$

derived from the equation discussed in the Background where g is a vector describing the degraded multi-channel image, e.g., a degraded Bayer image, received by the image processor and H is an image degradation matrix containing image degradation kernels that may represent both intra- and inter-channel degradations, and is thus not a diagonal matrix. The degrading kernels may be the same size and are represented by $h_i(m, n)$, where i is the channel, m=1 ... M, n=1 ... M and M×M is the size of the degrading kernel. The degrading kernels may be representative of both blur and crosstalk through point spread functions (PSFs).

At step 11, the degraded image vector g is constructed and may have the form:

$$g = \{g_0(0,0), g_1(0,0), \ldots, g_{P-1}(0,0), \ldots, g_0(N-1,N-1), g_1(N-1,N-1), \ldots, g_{P-1}(N-1,N-1)\}^T$$

where $^T$ is the matrix transpose operation, P is the number of color channels, N is the number of pixels in each image, and N is derived by multiplying the number of rows N1 by the number of columns N2 (N=N1×N2). For example, if the multi-channel image is a Bayer image, P may equal four ($G_1$, R, B, $G_2$). The size in pixels of the degraded multi-channel image g after a two-dimensional convolution is L=S1×S2, where S1=N1+M−1, and S2=N2+M−1.

At step 12, the image degradation matrix H is constructed by any means known in the art. The image degradation matrix H may be, e.g., an N*P×N*P nested-block Toeplitz matrix.

At step 13, a image degradation matrix H is transformed into a circulant matrix Hc to facilitate diagonalization of image degradation matrix H in subsequent steps. Circulant matrix Hc may take the form:

$$Hc = \begin{bmatrix} H_0 & H_1 & H_2 & \cdots & \cdots & H_{S1-1} \\ H_{S1-1} & H_0 & H_1 & H_2 & \ddots & \vdots \\ H_{S1-2} & H_{S1-1} & H_0 & H_1 & \ddots & \vdots \\ \vdots & H_{S1-2} & H_{S1-1} & H_0 & \ddots & H_2 \\ \vdots & \ddots & \ddots & \ddots & \ddots & H_1 \\ H_1 & \cdots & \cdots & H_{S1-2} & H_{S1-1} & H_0 \end{bmatrix},$$

where $$H_k = \begin{bmatrix} h_{0,k} & h_{1,k} & h_{2,k} & \cdots & \cdots & h_{S2-1,k} \\ h_{S2-1,k} & h_{0,k} & h_{1,k} & h_{2,k} & \ddots & \vdots \\ h_{S2-2,k} & h_{S2-1,k} & h_{0,k} & h_{1,k} & \ddots & \vdots \\ \vdots & h_{S2-2,k} & h_{S2-1,k} & h_{0,k} & \ddots & h_{2,k} \\ \vdots & \ddots & \ddots & \ddots & \ddots & h_{1,k} \\ h_{1,k} & \cdots & \cdots & h_{S2-2,k} & h_{S2-1,k} & h_{0,k} \end{bmatrix},$$

and each $h_{j,k}$ is a P×P Toeplitz matrix containing the degrading kernels $h_i(m, n)$ in block-Toeplitz form. Matrix Hc may be an L*P×L*P matrix.

At step 14, a frequency transformation matrix S is constructed and may take the form:

$$S = \begin{bmatrix} (W_{S1} \otimes W_{S2})(0,0) * I_P & (W_{S1} \otimes W_{S2})(0,1) * I_P & \cdots & \cdots & (W_{S1} \otimes W_{S2})(0, L-1) * I_P \\ (W_{S1} \otimes W_{S2})(1,0) * I_P & (W_{S1} \otimes W_{S2})(1,1) * I_P & \ddots & \ddots & \vdots \\ \vdots & \vdots & \ddots & \ddots & \vdots \\ \vdots & \ddots & \ddots & \ddots & \vdots \\ (W_{S1} \otimes W_{S2})(L-1,0) * I_P & (W_{S1} \otimes W_{S2})(L-1,1) * I_P & \cdots & \cdots & (W_{S1} \otimes W_{S2})(L-1, L-1) * I_P \end{bmatrix}$$

where $W_j$ has as columns the basis functions of the Discrete Fourier Transform (DFT), $\otimes$ symbolizes a Kronecker product operation and $I_p$ is a P×P identity matrix.

Figure 2A:
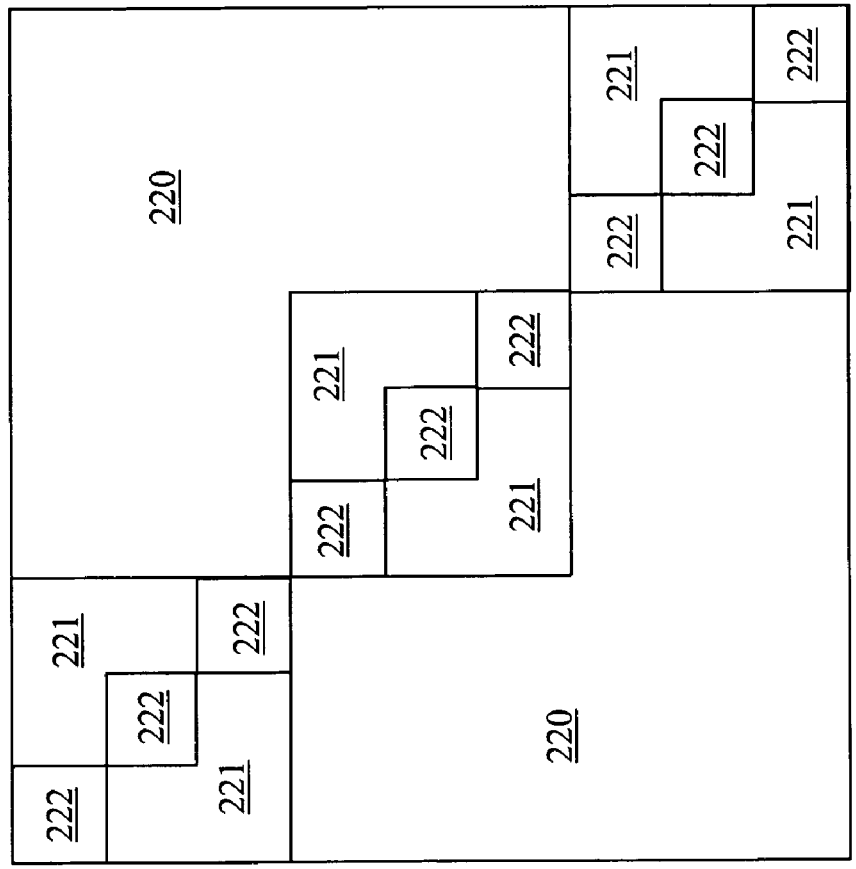
FIG. 2A is a diagram of a matrix an embodiment described herein.

The frequency transformation matrix S is applied to the circulant matrix Hc (step 15) such that:

$$SHcS^{-1} = \Lambda_H$$

where $\Lambda_H$ is a block diagonal matrix having on its diagonal P×P multi-channel frequency response matrices. FIG. 2A shows the structure of matrix $\Lambda_H$ with P×P multi-channel frequency response matrices 222. Areas 220 and 221 contain only zeroes, thus making $\Lambda_H$ a block diagonal matrix. Frequency transformation S is applied for the purpose of diagonalizing Hc because matrix operations are more efficient when performed on a diagonal matrix.

Referring again to FIG. 2, at step 16 the frequency transformation matrix S is applied to the degraded image vector g by solving for Hc in the equation of step 15 and substituting with H in the original estimate equation ($\hat{f} = H^{-1}g$) to obtain an optimal estimate of the restored multi-channel image $\hat{f}$:

$$\hat{f} = S\Lambda_H^{-1}S^{-1}g.$$

Figure 2B:
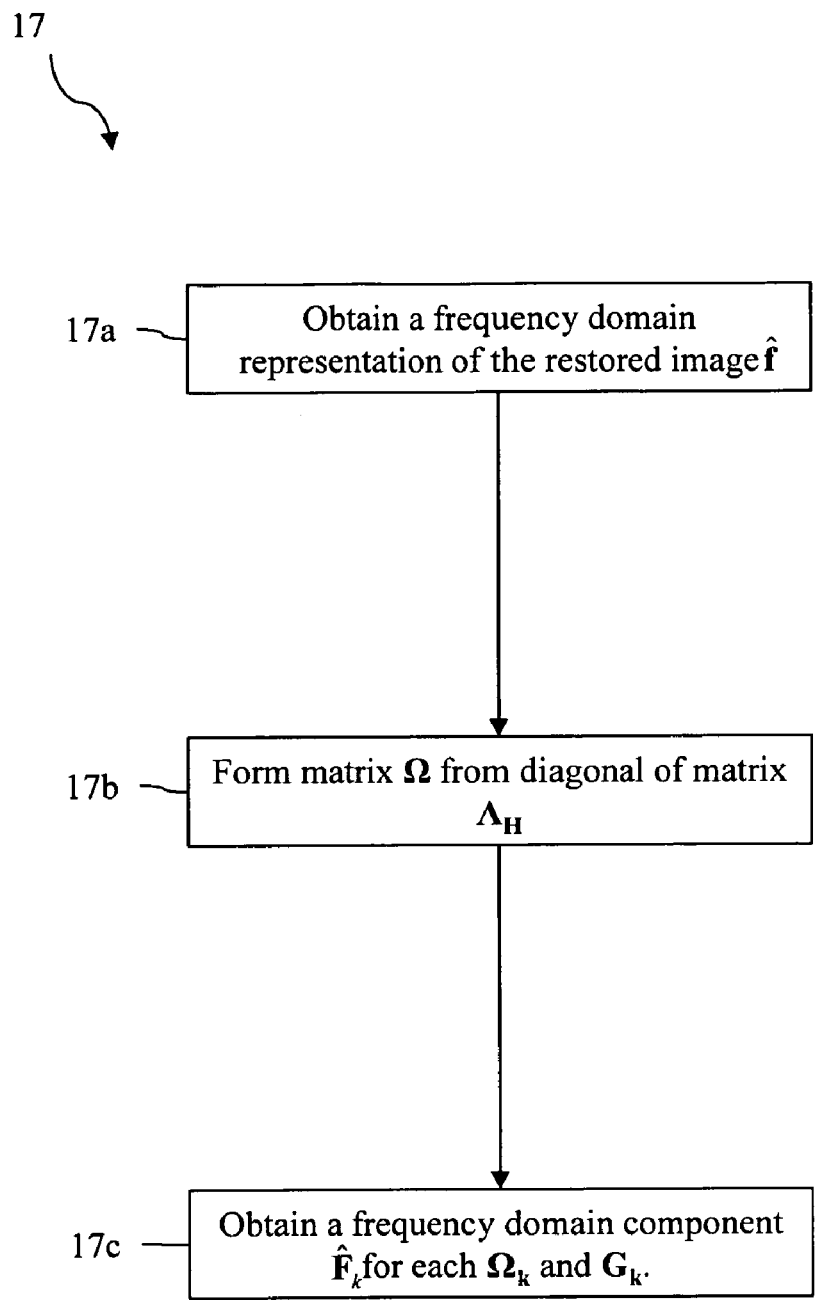
FIG. 2B is a flowchart illustrating a method of operating an imager according to an embodiment described herein.

At step 17, a frequency domain solution $\hat{F}$ is obtained for the restored multi-channel image $\hat{f}$. The steps for obtaining the frequency domain solution $\hat{F}$ are illustrated in FIG. 2B. The first step 17a is to multiply $S^{-1}$ by both sides of the equation in step 16 to obtain a frequency domain representation of that equation:

$$\hat{F} = \Lambda_H^{-1}G$$

where G is a frequency domain representation of the degraded image vector g. The next step 17b is to componentize matrix $\Lambda_H$ to form matrix $\Omega$ using the P×P frequency response matrices 222 (FIG. 2A) in the diagonal of matrix $\Lambda_H$ such that:

$$\Omega = \begin{bmatrix} \Omega_0 \\ \Omega_1 \\ \vdots \\ \Omega_{L-1} \end{bmatrix}$$

The next step 17c is to componentize the frequency domain solution $\hat{f}$ to obtain $\hat{F}_k$ for each $\Omega_k$ and $G_k$ such that:

$$\hat{F}_k = \Omega_k^{-1}G_k$$

where k=0 ... L−1 and k indexes each P×1 transform coefficient-tuple in the column vectors $\hat{F}_k$, $G_k$ and corresponding frequency response matrix 222 (FIG. 2A) on the diagonal of $\Lambda_H$.

Figure 2C:
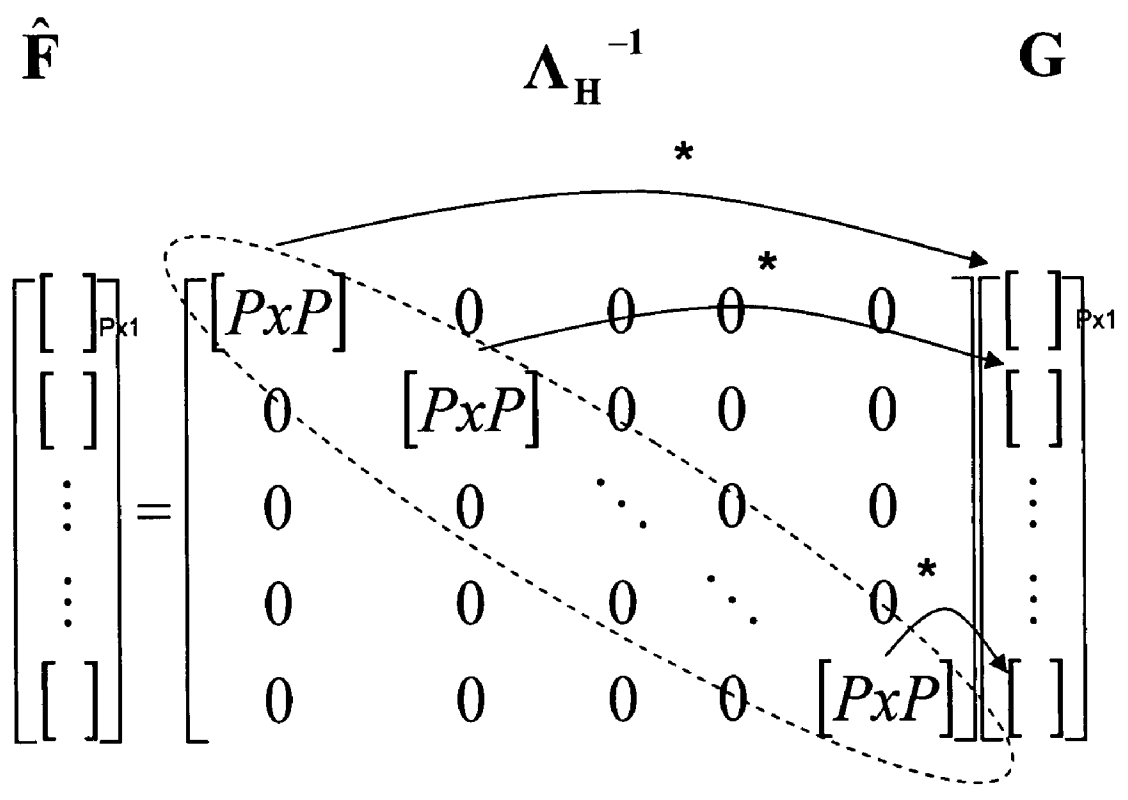

The operation performed in step 17c (FIG. 2B) is illustrated in FIG. 2C where * denotes matrix-vector multiplication. FIG. 2C shows each P×P matrix on the diagonal of matrix $\Lambda_H$, each referred to as $\Omega_k$ in step 17b (FIG. 2B), multiplied (*) by a corresponding P×1 entry $G_k$ in vector G.

This matrix-vector multiplication produces a corresponding entry $\hat{F}_k$ in the resulting vector $\hat{F}$.

Referring back to FIG. 2, at step 18 the spatial domain solution is obtained from the frequency domain solution $\hat{F}$ by any available means, e.g., an inverse two dimensional Discrete Fourier Transform (DFT).

Figure 3:
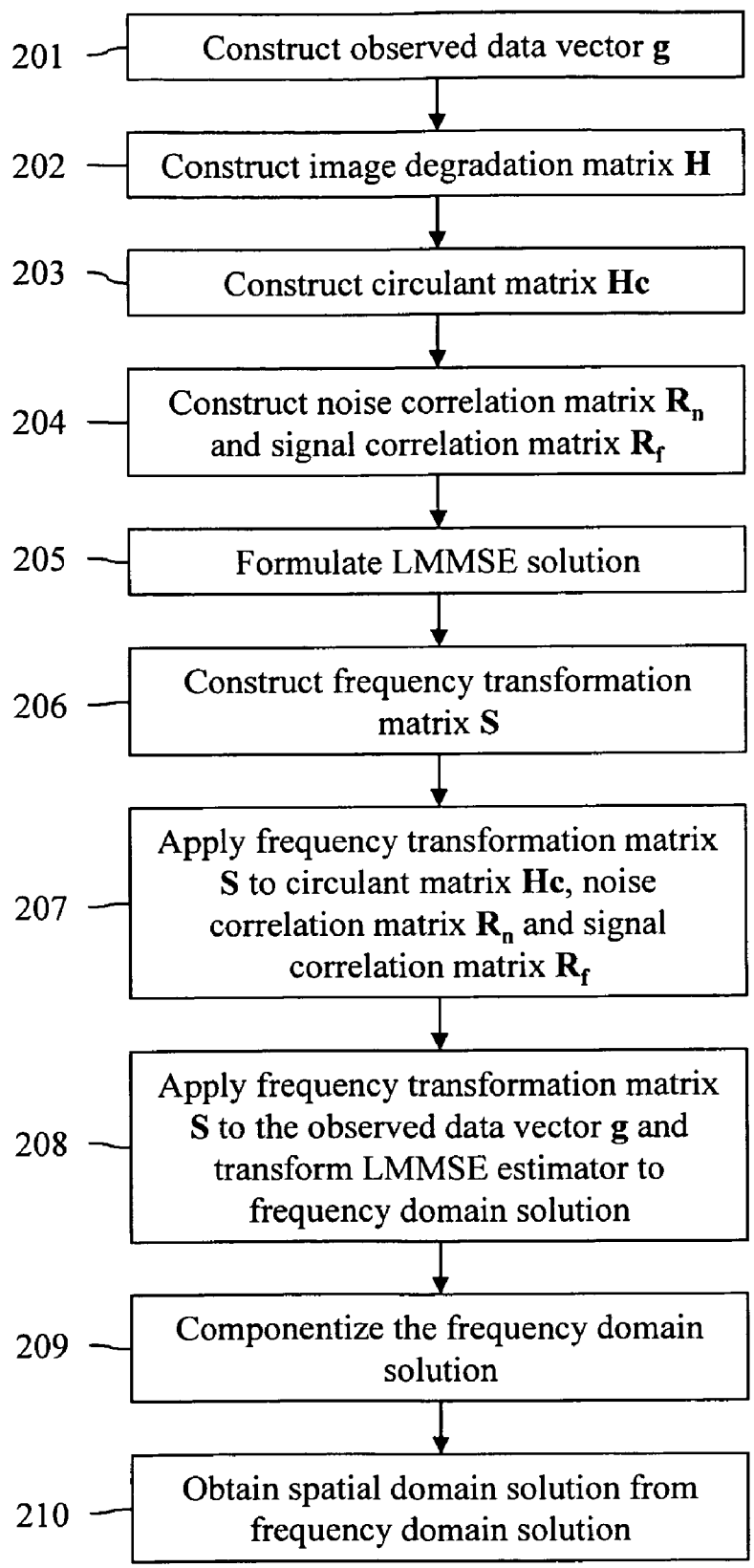
FIG. 3 is a flowchart illustrating a method of operating an imager according to an embodiment described herein.

FIG. 3 shows a second method embodiment for restoring a degraded multi-channel image, e.g. a degraded Bayer image, where a noise component n is part of the degradation being removed. The first three steps 201, 202, 203 are to construct an degraded image vector g, an image degradation matrix H and a circulant matrix Hc in the same manner described with respect to FIG. 2. At step 204, a noise correlation matrix $R_n$ and a signal correlation matrix $R_f$ are constructed by any available means such that the noise correlation matrix $R_n$ is assumed diagonal and reflects assumption of whiteness of the multichannel noise, and the signal correlation matrix $R_f$ is diagonalizable by using the transformation S. Methods of constructing a noise correlation matrix $R_n$ and a signal correlation matrix $R_f$ are discussed in A. K. Jain, *Fundamentals of digital image processing* 35-36 (1989).

At step 205, an optimal linear minimum mean square error (LMMSE) is obtained and may take the form of:

$$\hat{f} = R_f Hc^T (HcR_f Hc^T + R_n)^{-1} g$$

At step 206, a frequency transformation matrix S is constructed according to the description of step 14 in FIG. 2. At step 207, the frequency transformation matrix S is applied to the circulant matrix Hc, noise correlation matrix $R_n$ and signal correlation matrix $R_f$ such that:

$$SHcS^{-1} = \Lambda_H,$$

$$SR_f S^{-1} = \Lambda_f \text{ and}$$

$$SR_n S^{-1} = \Lambda_n.$$

At step 208, the transformation matrix S is applied to the degraded image vector g and the LMMSE frequency domain solution $\hat{F}$ is obtained by solving for Hc, $R_f$ and $R_n$, respectively, in the equations of step 207 and substituting for the corresponding values in the original LMMSE estimator ($\hat{f} = R_f Hc^T (HcR_f Hc^T + R_n)^{-1} g$) to obtain a frequency domain solution $\hat{F}$:

$$\hat{F} = \Lambda_f \Lambda_H^{*T} [\Lambda_H \Lambda_f \Lambda_H^{*T} + \Lambda_n]^{-1} G$$

where $*T$ is the complex conjugate-transpose operation.

At step 209, the frequency domain solution $\hat{F}$ is componentized to obtain the componentized frequency domain solution $\hat{F}_k$ represented by:

$$\hat{F}_k \Phi_k \Omega_k^{*T} \psi_k G_k,$$

where $\psi = [\Lambda_H \Lambda_f \Lambda_H^{*T} + \Lambda_n]^{-1}$ and has the form:

$$\Psi = \begin{bmatrix} \Psi_0 \\ \Psi_1 \\ \vdots \\ \Psi_{L-1} \end{bmatrix},$$

where $\Omega$ is comprised of the P×P frequency response matrices 222 (FIG. 2A) in the diagonal of matrix $\Lambda_H^{*T}$ and has the form:

$$\Omega = \begin{bmatrix} \Omega_0 \\ \Omega_1 \\ \vdots \\ \Omega_{L-1} \end{bmatrix},$$

where $\Phi$ is comprised of the P×P frequency response matrices 222 (FIG. 2A) in the diagonal of matrix $\Lambda_f$ and has the form:

$$\Phi = \begin{bmatrix} \Phi_0 \\ \Phi_1 \\ \vdots \\ \Phi_{L-1} \end{bmatrix},$$

where k=0 . . . L−1 and k indexes each P×1 transform coefficient-tuple in the column vectors $\hat{F}_k$ and $G_k$, and each P×P matrix $\Phi_k$, $\Omega_k$ and $\psi_k$. These substitutions are possible because the matrices $\Lambda_f$ and $\Lambda_H^{*T}$, like matrix $\Lambda_H$ illustrated in FIG. 2A, are block diagonal matrices with blocks of size P×P, allowing the diagonal blocks to be put in block column matrices. At step 210, the spatial domain solution is obtained from the frequency domain solution $\hat{F}$ by any available means, e.g., by using an inverse Discrete Fourier Transform (DFT).

Figure 4:
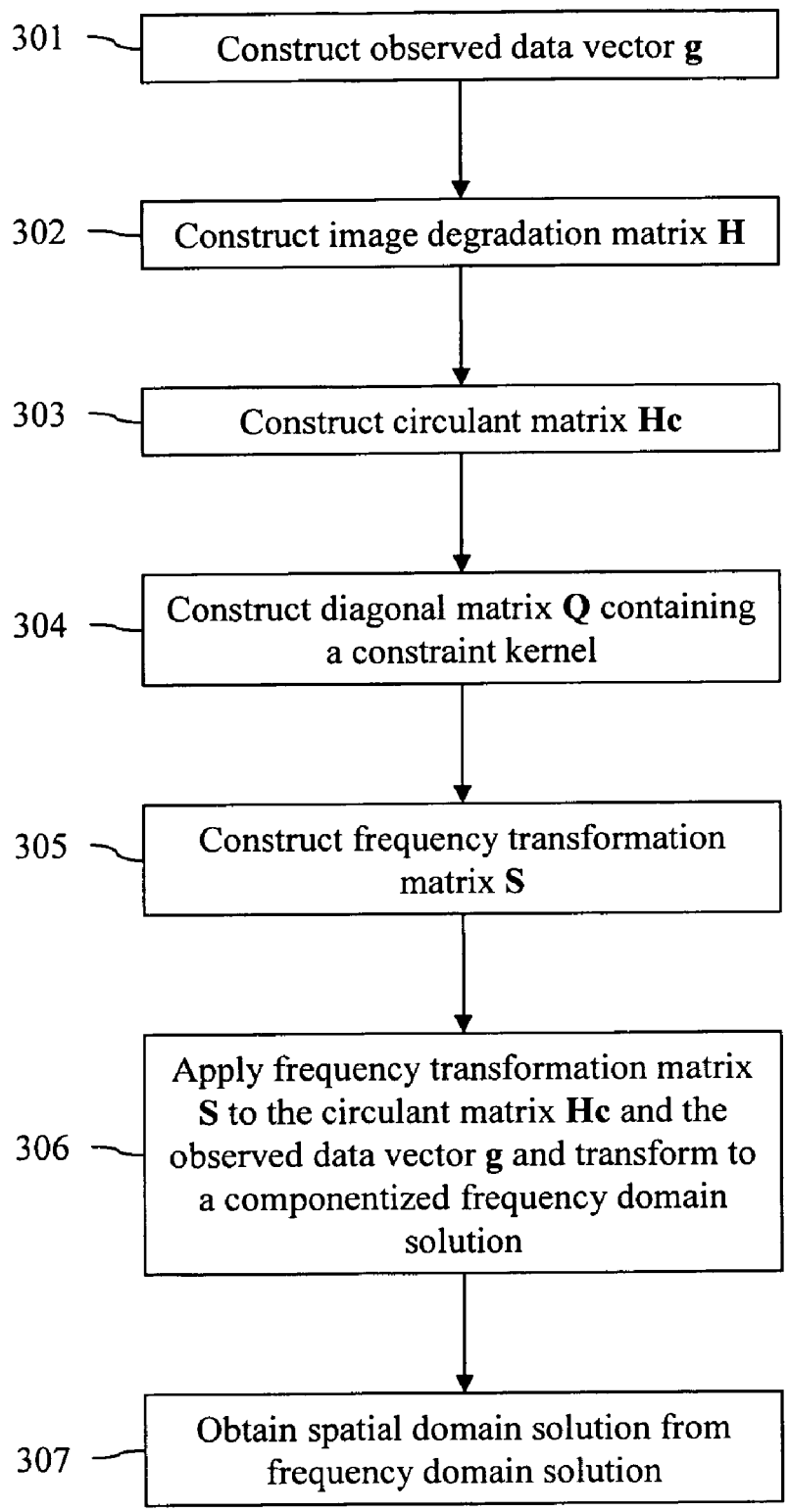
FIG. 4 is a flowchart illustrating a method of operating an imager according to an embodiment described herein.

FIG. 4 shows a third method embodiment for restoring a degraded multi-channel image, e.g. a degraded Bayer image, where a noise component n is part of the degradation being restored. The method described in FIG. 4 differs from the method described in FIG. 3 in that, rather than constructing noise and signal correlation matrices $R_f$ and $R_n$, a diagonal matrix Q (e.g., step 304) is constructed that contains a predetermined constraint kernel (e.g., a sharpening operator). One example of a constraint is a smoothness constraint, e.g., the Tikhonov-Miller formulation.

Steps 301-303 are performed as described above with respect to steps 201-203 (FIG. 3). At step 304, the diagonal matrix Q is constructed such that the estimate of the restored multi-channel image $\hat{f}$ is:

$$\hat{f} = (H^T H + \lambda Q^T Q)^{-1} H^T g$$

where λ is a scalar that can be determined experimentally or analytically. Methods of determining λ are discussed in A. K. Jain, *Fundamentals of digital image processing* 298 (1989).

At step 305, a frequency transformation matrix S is constructed as done in steps 14 (FIG. 2) and 206 (FIG. 3). At step 306, the frequency transformation matrix S is applied to the circulant matrix Hc and the degraded image vector g; in addition, the equation of step 304 is transformed to a componentized frequency domain solution $\hat{F}_k$ defined as:

$$\hat{F}_k = (\Omega_k^{*T} \Omega_k + \lambda Q_k^{*T} Q_k)^{-1} \Omega_k^{*T} G_k.$$

At step 307, the spatial domain solution is obtained from the frequency domain solution $\hat{F}$ by any available means, e.g., by using an inverse Discrete Fourier Transform (DFT).

Figure 5:
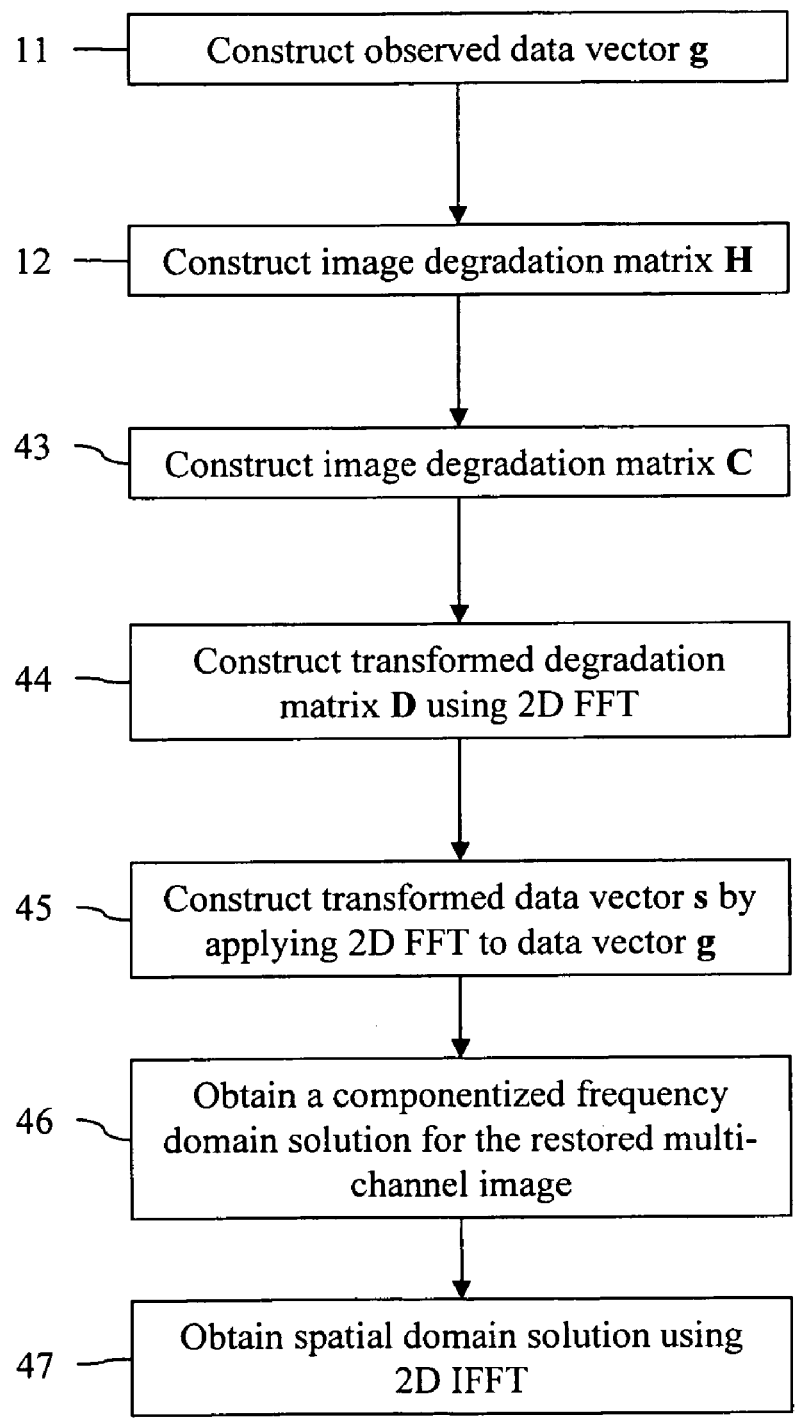
FIG. 5 is a flowchart illustrating a method of operating an imager according to an embodiment described herein.

FIG. 5 shows a fourth method embodiment for restoring a degraded multi-channel image, e.g. a degraded Bayer image. Like the method described in FIG. 2, the embodiment in FIG. 5 does not consider a noise component n in the degradation being restored. Unlike the method described in FIG. 2, however, the embodiment shown in FIG. 5 uses Fast Fourier Transforms (FFTs) to transform to the frequency domain and then transform back to the spatial domain.

The first two steps 11, 12 are to construct a degraded image vector g and an image degradation matrix H as described above for steps 11, 12 in FIG. 2. At step 43, an image degradation matrix C is constructed that contains the first P columns in H. Thus, C is of the size L*P×P and contains the first block-column of P×P blocks from H. Image degradation matrix C may take the form:

$$C = \begin{bmatrix} C_0 \\ C_1 \\ \vdots \\ C_{L-1} \end{bmatrix}.$$

where each $C_k$ is of size P×P, and k=1 ... L−1.

Figure 5A:
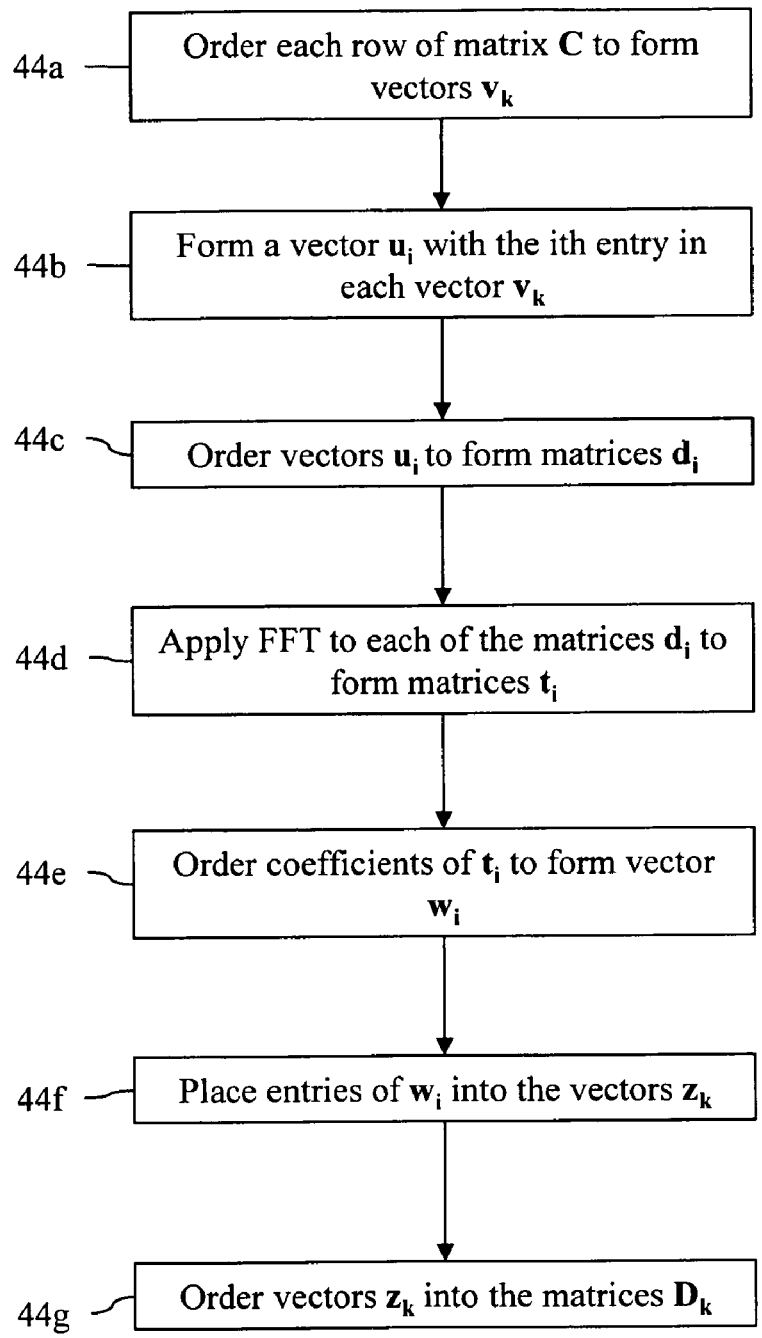
FIG. 5A is a flowchart illustrating a method of operating an imager according to an embodiment described herein.
Figure 5B:
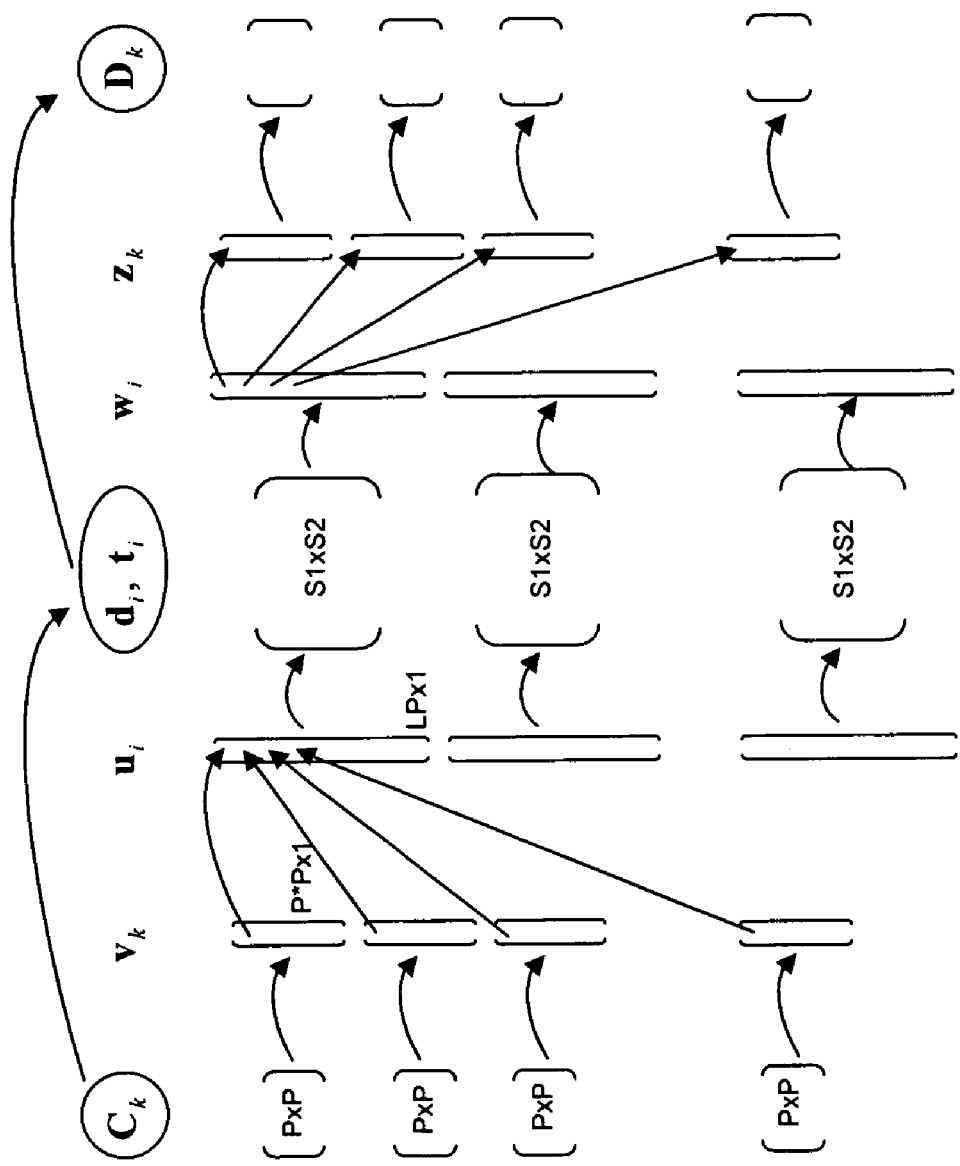
FIG. 5B is an illustration of a method of operating an imager according to an embodiment described herein.

At step 44, a transformed degradation matrix D is constructed by transforming image degradation matrix C using a two dimensional (2D) Fast Fourier Transform (FFT). FIG. 5A shows one of example of the steps involved in constructing a transformed degradation matrix D and FIG. 5B shows a graphical representation of the construction of a transformed degradation matrix D using the example method of FIG. 5A. It is to be understood that FIGS. 5A and 5B are not limiting and are not intended to show the only method of constructing the transformed degradation matrix D.

Referring to FIG. 5A, the first step 44a is to lexicographically order each row $C_k$ from the image degradation matrix C by stacking up each row of $C_k$ in order in a single column vector $v_k$. Each of the corresponding resulting vectors $v_k$ is of size $p^2 \times 1$. The next step 44b is to form vectors $u_i$ of size L×1 with the ith entry in each vector $v_k$ (=0 ... $P^2$−1). For example, if P=4 there will be 16 u vectors. The next step 44c is to inverse-lexicographically order the vectors $u_i$ to form the corresponding matrices $d_i$ of size S1×S2. At step 44d, a two dimensional (2D) Fast Fourier Transform (FFT) Γ is applied to each of the matrices $d_i$ to form matrices $t_i$:

$$t_i = \Gamma(d_i).$$

The next step 44e is to lexicographically order the transform coefficients in each $t_i$ into a corresponding vector $w_i$ of size L×1. At step 44f, the sequential entries in each of the $w_i$ vectors are placed into the ith position of each of the new vectors $z_k$ of size $P^2 \times 1$. The next step 44g is to inverse-lexicographically order the vectors $z_k$ into the corresponding matrix of coefficients $D_k$ such that the frequency transform of matrix C effected by the transformation matrix S is given by:

$$D = \begin{bmatrix} D_0 \\ D_1 \\ \vdots \\ D_{L-1} \end{bmatrix}.$$

Figure 5C:
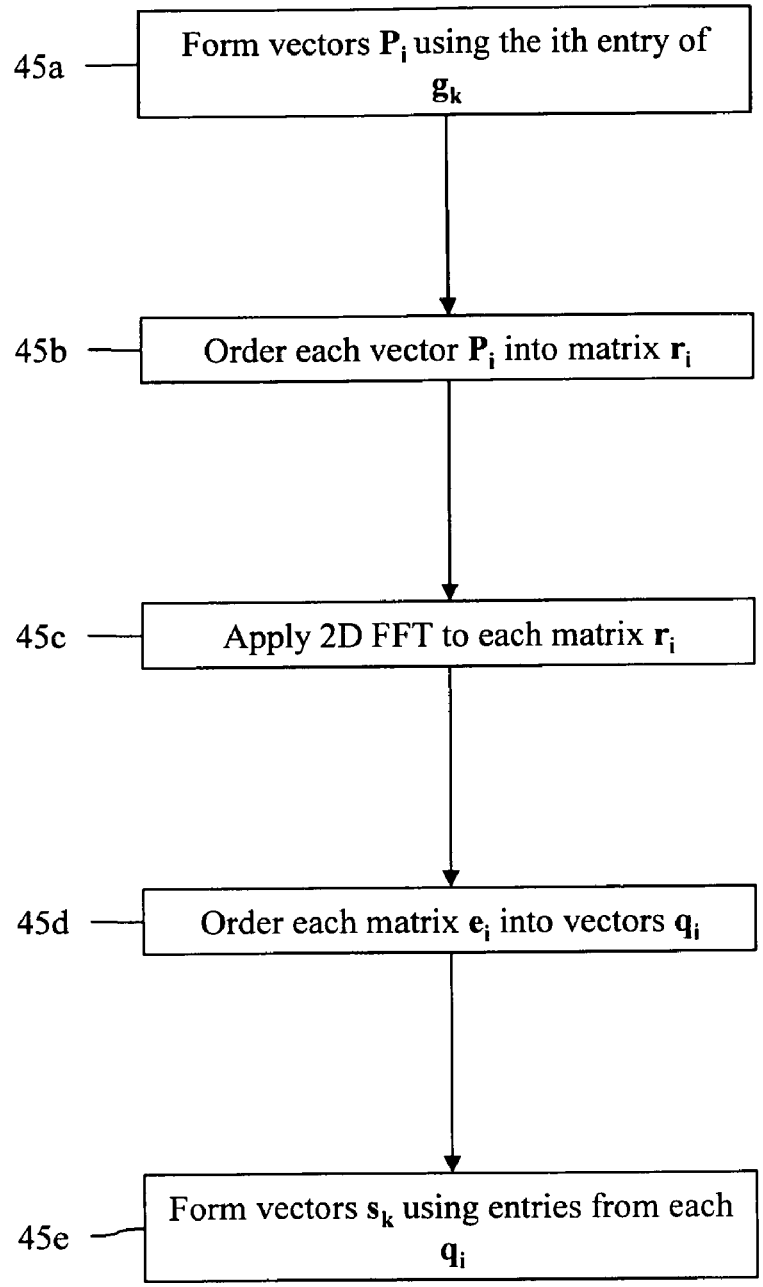
FIG. 5C is a flowchart illustrating a method of operating an imager according to an embodiment described herein.

Referring again to FIG. 5, at step 45, a transformed data vector s is constructed by applying a two dimensional (2D) Fast Fourier Transform (FFT) to data vector g. FIG. 5C shows the steps involved in determining transformed vector s by applying a two dimensional (2D) Fast Fourier Transform (FFT) to data vector g. For the purposes of FIG. 5C, it is assumed that g has the form:

$$g = \begin{bmatrix} g_0 \\ g_1 \\ \vdots \\ g_{L-1} \end{bmatrix}$$

where each $g_k$ is of size L×1. At step 45a the ith entry in each $g_k$ is placed in sequential order in a vector $p_i$ of size L*P×1. The next step 45b is to inverse-lexicographically order each vector $p_i$ into a matrix $r_i$ of size S1×S2. At step 45c, two dimensional (2D) FFT Γ is applied to each matrix $r_i$:

$$e_i = \Gamma(r_i).$$

The next step 45d is to lexicographically order each of the matrix of coefficients $e_i$ into a corresponding vector of coefficients $q_i$ of size L*P×1. At step 45e the sequential entries from each of the $q_i$ vectors are placed into the ith position of each of the new vectors $s_k$ of size P×1. Transformed data vector s may have the form:

$$s = \begin{bmatrix} s_0 \\ s_1 \\ \vdots \\ s_{L-1} \end{bmatrix}.$$

Referring back to FIG. 5, at step 46, the componentized frequency domain solution $\hat{F}_k$ is obtained for the restored channel image using the following formula:

$$\hat{F}_k = D_k^{-1} s_k.$$

At step 47, a spatial domain solution is obtained using a two dimensional (2D) inverse Fast Fourier Transform (IFFT). The implementation of step 47 may be performed using the steps performed in FIG. 5C, but in reverse order.

Figure 6:
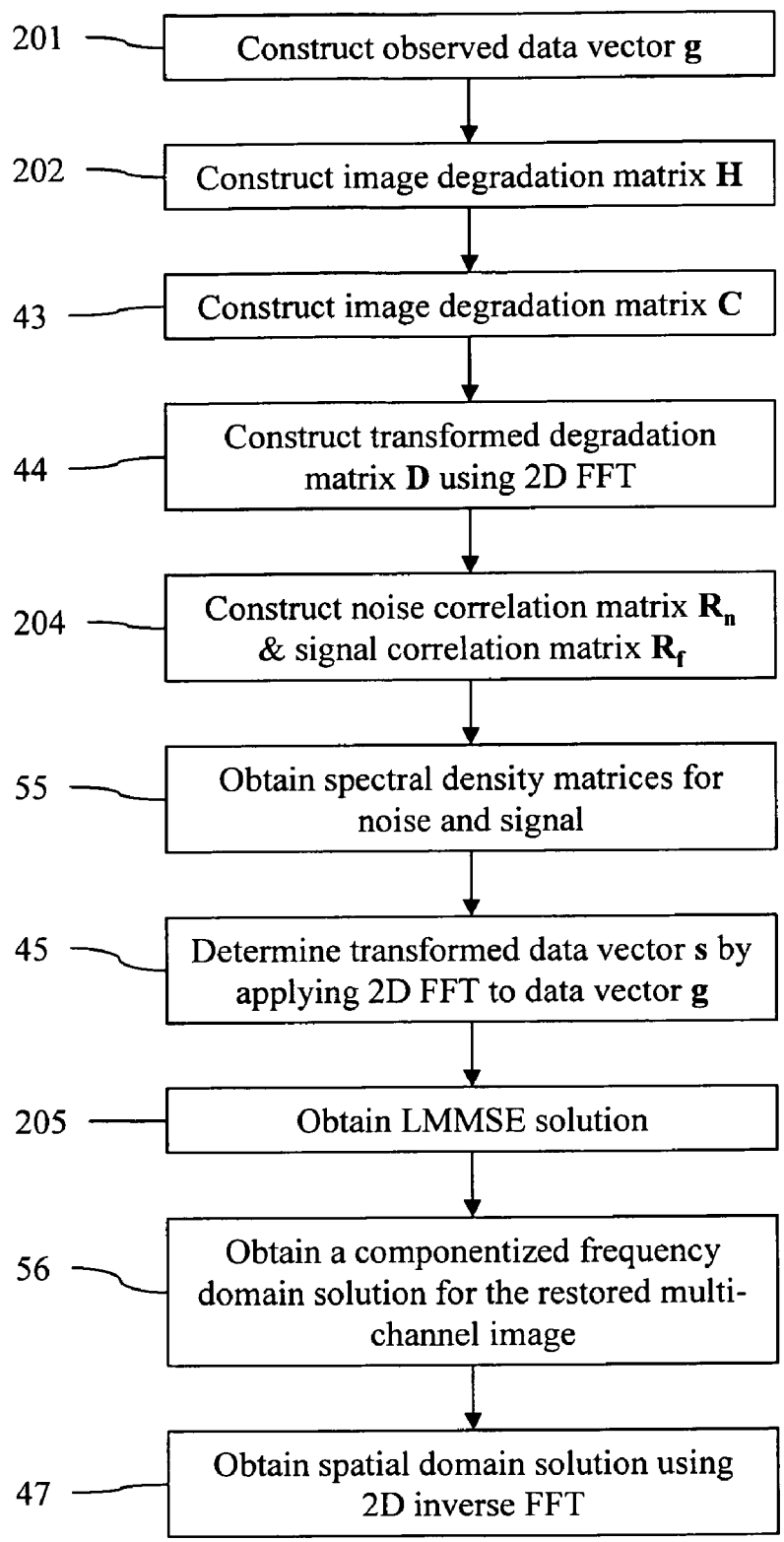
FIG. 6 is a flowchart illustrating a method of operating an imager according to an embodiment described herein.

FIG. 6 shows a fifth method embodiment for restoring a degraded multi-channel image, e.g. a degraded Bayer image. Like the method described in FIG. 3, the embodiment in FIG. 6 includes a noise component n in the degradation being restored. Unlike the method described in FIG. 3, however, the embodiment shown in FIG. 6 uses Fast Fourier Transforms (FFTs) to transform to the frequency domain and then transform back to the spatial domain.

The first two steps 201, 202 are to construct an degraded image vector g and an image degradation matrix H, and may be performed according to the description of steps 201, 202 of FIG. 3. Referring again to FIG. 6, the next two steps 43, 44 are to construct an image degradation matrix C and a transformed degradation matrix D using a two dimensional (2D) Fast Fourier Transform (FFT) and may be performed according to the description of steps 43, 44 in FIGS. 5 and 5A. Referring again to FIG. 6, at step 204, a noise correlation matrix $R_n$ and a signal correlation matrix $R_f$ are constructed. One preferred method may be performed according to the description of step 204 of FIG. 3.

Referring again to FIG. 6, at step 55 spectral density matrices are obtained for the noise and signal, respectively, by any means known in the art. At step 45, a transformed data vector s is constructed by applying a two dimensional (2D) Fast Fourier Transform (FFT) to data vector g. One preferred technique may be performed according to the description of step 45 in FIG. 5. Referring again to FIG. 6, at step 205 an optimal linear minimum mean square error (LMMSE) is obtained. Step 205 may be performed according to the description of step 205 in FIG. 3 to produce the following:

$$\hat{f} = R_f H^T (H R_f H^T + R_n)^{-1} g.$$

Referring again to FIG. 6, at step 56 a componentized frequency domain solution $\hat{F}_k$ is obtained for the restored multi-channel image using the following formula derived from the LMMSE solution with the values $D_k$ and $s_k$ substituted for H and G, respectively:

$$\hat{F}_k = R_f D_k^T (D_k R_f D_k^T + R_n)^{-1} s_k.$$

At step 47, a spatial domain solution is obtained using a two dimensional (2D) inverse Fast Fourier Transform (FFT). Step 47 may be performed according to the description of step 47 in FIG. 5.

Figure 7:
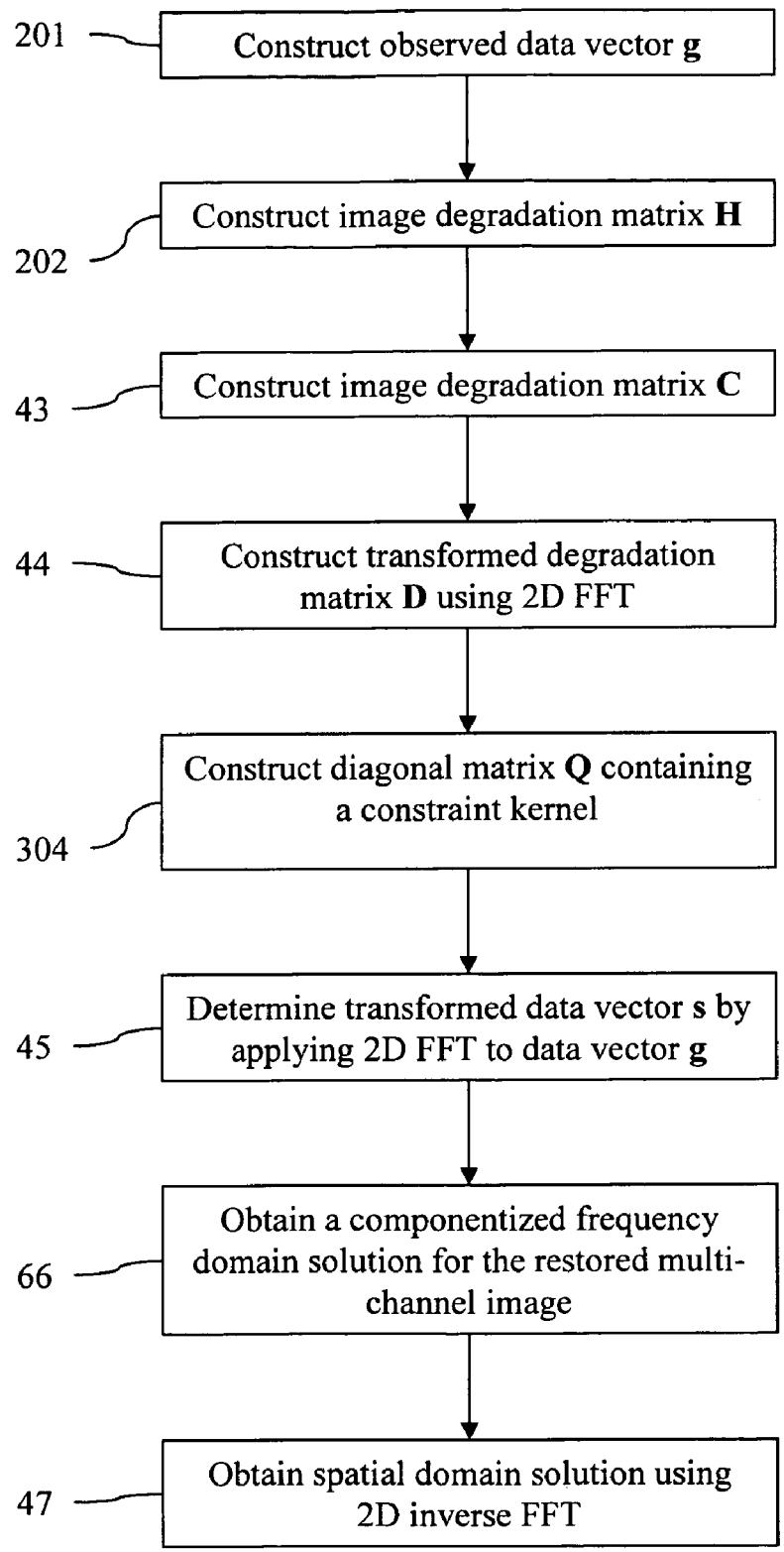
FIG. 7 is a flowchart illustrating a method of operating an imager according to an embodiment described herein.

FIG. 7 shows a sixth method embodiment for restoring a degraded multi-channel image, e.g. a degraded Bayer image. Like the methods described in FIGS. 3, 4 and 6, the embodiment in FIG. 7 includes a noise component n in the degradation being restored. Like the method described in FIG. 6, the embodiment shown in FIG. 7 uses Fast Fourier Transforms (FFTs) to transform to the frequency domain and then transform back to the spatial domain. As with the embodiment described in FIG. 4, the embodiment described in FIG. 7 constructs a diagonal matrix Q that contains a predetermined constraint kernel (e.g., a sharpening operator).

Referring to FIG. 7, the steps 201, 202, 43, 44 may be performed according to the description of steps 201, 202, 43, 44 of FIG. 6. Referring again to FIG. 7, at step 304 diagonal matrix Q containing a constraint kernel is constructed. Step 304 may be performed according to the description of step 304 in FIG. 4. Referring again to FIG. 7, at step 45 a transformed data vector s is obtained by applying two dimensional (2D) Fast Fourier Transform (FFT) to the data vector g. Step 45 may be performed according to the description of step 45 of FIG. 6. Referring again to FIG. 7, at step 66 a componentized frequency domain solution is obtained for the restored multi-channel image using the following formula with the values $D_k$ and $S_k$ substituted for H and G, respectively:

$$\hat{f} = (D_k^T D_k + \lambda Q_k^{*T} Q_k)^{-1} D_k^T s_k.$$

At step 47, a spatial domain solution is obtained using a two dimensional (2D) inverse Fast Fourier Transform (FFT). Step 47 may be performed according to the description of step 47 of FIG. 6.

Any of the embodiments discussed in FIGS. 2-7 can process within window boundary data if processing an entire image is not necessary, or if a spatial adaptation is desired. Processing within window boundary data would involve processing only portions of the degraded image g and image degradation matrix H.

Figure 8:
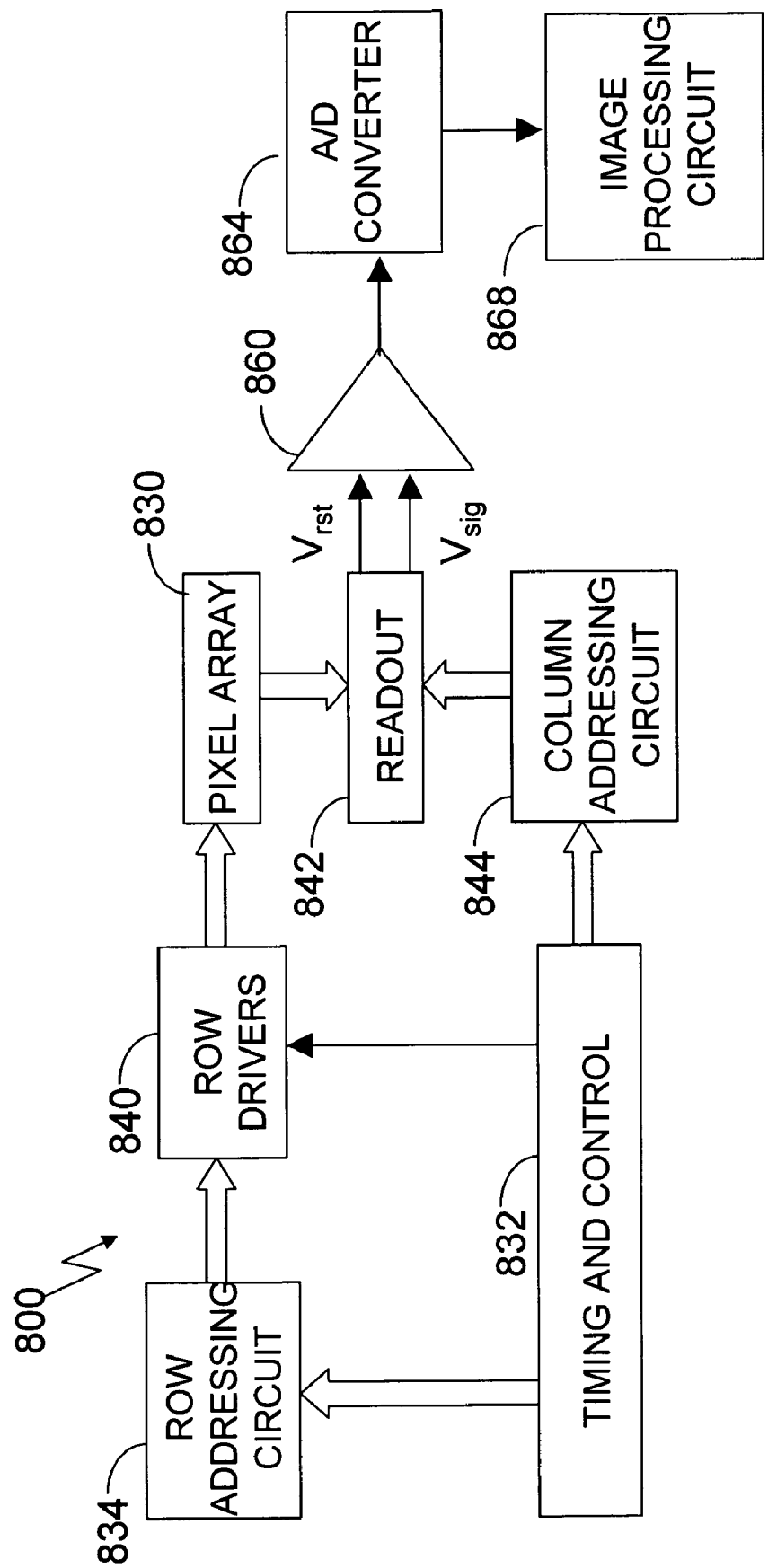
FIG. 8 is a block diagram of an imager according to an embodiment described herein.

FIG. 8 illustrates a block diagram example of a CMOS imager 800 having a image processing circuit 868 that is constructed to perform any of the embodiments and modified embodiments described above. Pixel array 830 comprises a plurality of pixels arranged in a predetermined number of columns and rows in a Bayer color pattern. The pixels of each row in array 830 are operated by row select lines, and the pixels of each column are selectively output by respective column select lines. A plurality of row and column lines are provided for the entire array 830. The row lines are selectively activated by a row driver 840 in response to row address circuit 834. The column select lines are selectively activated by a column addressing circuit 844. Thus, a row and column address is provided for each pixel. The pixel signals $V_{rst}$, $V_{sig}$ read out from each pixel are subtracted in differential amplifier 860 and are converted to digital signals by analog-to-digital converter 864 that supplies the digital signal to the image processing circuit 868 that processes each pixel signal by, for example, restoring degraded images, and forms an image that can be displayed, stored, or output.

Figure 9:
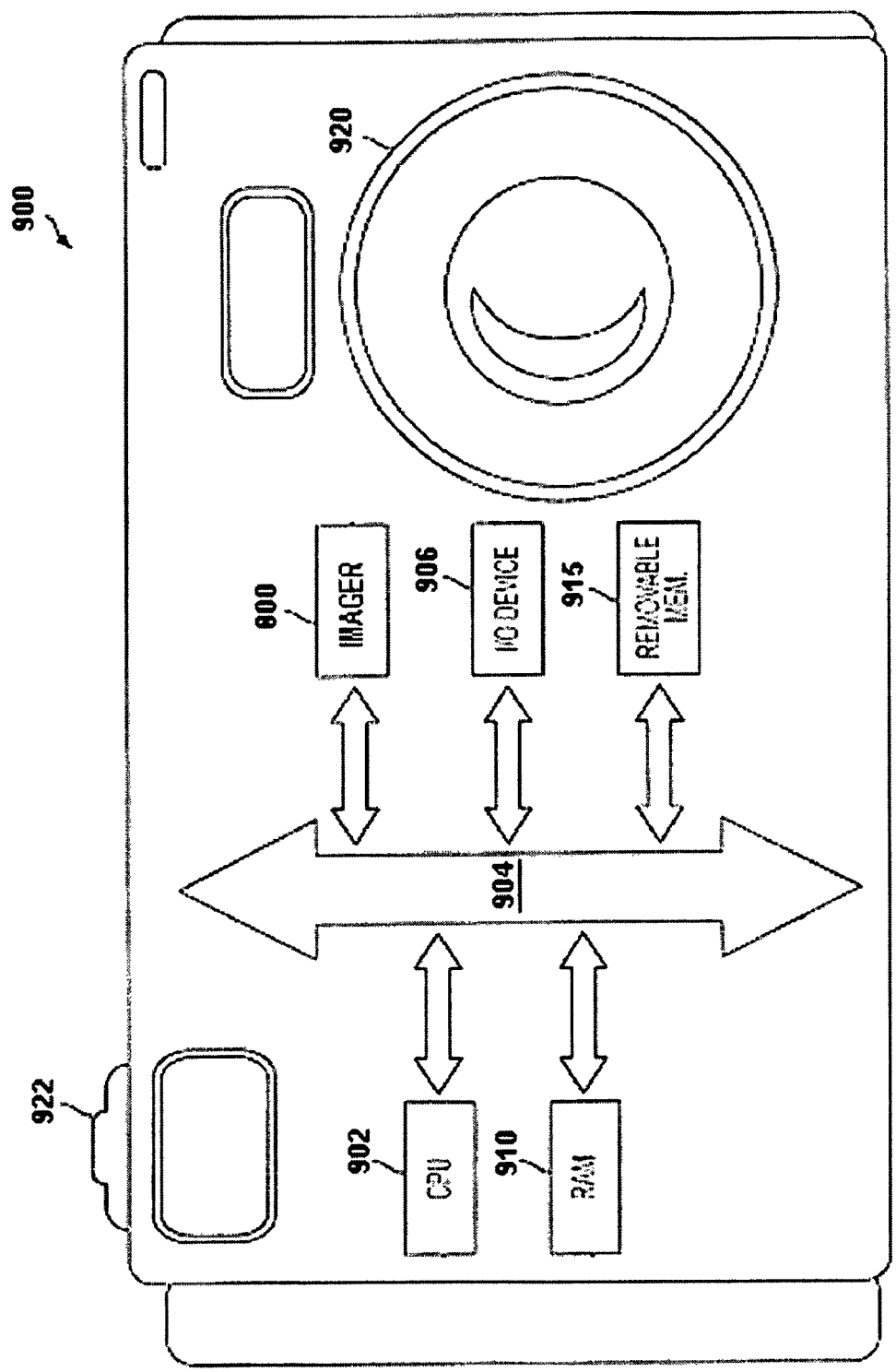
FIG. 9 is a block diagram of a processor system according to an embodiment described herein.

FIG. 9 shows a typical system 900 modified to include an imager 800 constructed and operated in accordance with an embodiment. The system 900 is a system having digital circuits that could include imaging devices. Without being limiting, such a system could include a computer system, camera system, scanner, machine vision, vehicle navigation, video phone, surveillance system, auto focus system, star tracker system, motion detection system, image stabilization system, or other image acquisition system.

System 900, for example a digital still or video camera system, generally comprises a central processing unit (CPU) 902, such as a control circuit or microprocessor for conducting camera functions, that communicates with one or more input/output (I/O) devices 906 over a bus 904. Imaging device 800 also communicates with the CPU 902 over the bus 904. The system 900 also includes random access memory (RAM) 910, and can include removable memory 915, such as flash memory, which also communicates with the CPU 902 over the bus 904. The imaging device 800 may be combined with the CPU processor with or without memory storage on a single integrated circuit or on a different chip than the CPU processor. In a camera system, a lens 920 is used to focus light onto the pixel array 830 of the imaging device 800 when a shutter release button 922 is pressed.

What is claimed as new and desired to be protected by Letters Patent of the United States is:

1. An apparatus for restoring a degraded digital image, said apparatus comprising:
   an image processor configured to perform the steps of:
   transforming an image degradation matrix into a circulant matrix;
   applying a frequency transformation to the circulant matrix and a data vector to obtain a frequency domain solution for the restored image;
   componentizing the frequency domain solution to produce a plurality of frequency domain components; and
   processing each frequency domain component individually, wherein the frequency domain solution is componentized and represented by $\hat{F}_k = (\Omega_k^{*T} \Omega_k + \lambda Q_k^{*T} Q_k)^{-1} \Omega_k^{*T} G_k$ where $\Lambda_H$ is a block diagonal matrix having on its diagonal multi-channel frequency response matrices, G is the data vector after the frequency transformation, $\Omega_k$ represents a matrix in the diagonal the frequency transformed degradation matrix, $\lambda$ is a scalar and $Q_k$ is an entry in a matrix Q containing a predetermined constraint kernel.

2. The apparatus of claim 1, wherein the image processor is further configured to perform the step of:
   transforming the frequency domain solution to a spatial domain solution.

3. The apparatus of claim 1, wherein the frequency transformation has the following form:

$$S = \begin{bmatrix} (W_{S1} \otimes W_{S2})(0,0)*I_P & (W_{S1} \otimes W_{S2})(0,1)*I_P & \cdots & \cdots & (W_{S1} \otimes W_{S2})(0,L-1)*I_P \\ (W_{S1} \otimes W_{S2})(1,0)*I_P & (W_{S1} \otimes W_{S2})(1,1)*I_P & \ddots & \ddots & \vdots \\ \vdots & \vdots & \ddots & \ddots & \vdots \\ \ddots & \ddots & \ddots & \ddots & \vdots \\ \vdots & \ddots & \ddots & \ddots & \vdots \\ (W_{S1} \otimes W_{S2})(L-1,0)*I_P & (W_{S1} \otimes W_{S2})(L-1,1)*I_P & \cdots & \cdots & (W_{S1} \otimes W_{S2})(L-1,L-1)*I_P \end{bmatrix}$$

10 where S is the frequency transformation, $W_j$ has as columns the basis functions of a Discrete Fourier Transform (DFT), ⊗ symbolizes the Kronecker product operation, $I_p$ is a P×P identity matrix, P is a number of channels, N is a number of pixels in the digital image, and N is derived by multiplying a number of rows N1 in the image by the number of columns N2 in the image, a degrading kernel size for each channel is equal to M×M, L is the size in pixels of the degraded digital image after a two dimensional (2D) convolution, L=S1×S2, S1=N1+M−1 and S2=N2+M−1.

4. The apparatus of claim 1, wherein the frequency transformation is applied to the circulant matrix such that $SHcS^{-1}=\Lambda_H$, wherein S is the frequency transformation, Hc is the circulant matrix and $\Lambda_H$ is a block diagonal matrix having on its diagonal multi-channel frequency response matrices.

5. The apparatus of claim 1, wherein the frequency domain solution is derived from a linear minimum mean square error criteria.

6. The apparatus of claim 5, wherein the image processor is further configured to perform the steps of:
   constructing a noise correlation matrix and a signal correlation matrix; and
   applying the frequency transformation to the noise correlation matrix and the signal correlation matrix to obtain a frequency transformed noise matrix and a frequency transformed signal matrix.

7. An apparatus for restoring a degraded digital image, said apparatus comprising:
   an image processor configured to perform the steps of:
      transforming an image degradation matrix into a circulant matrix;
      applying a frequency transformation to the circulant matrix and a data vector to obtain a frequency domain solution for the restored image;
      componentizing the frequency domain solution to produce a plurality of frequency domain components;
      processing each frequency domain component individually, wherein the frequency domain solution is derived from a linear minimum mean square error criteria;
      constructing a noise correlation matrix and a signal correlation matrix; and
      applying the frequency transformation to the noise correlation matrix and the signal correlation matrix to obtain a frequency transformed noise matrix and a frequency transformed signal matrix, where the frequency domain solution has the form $\hat{F}=\Lambda_f\Lambda_H^{*T}[\Lambda_H\Lambda_f\Lambda_H^{*T}+\Lambda_n]^{-1}G$, where $\Lambda_f$ is the frequency transformed signal matrix, $\Lambda_n$ is the frequency transformed noise matrix, $\Lambda_H$ is the frequency transformed degradation matrix and G is the frequency transformed data vector.

* * * * *